United States Patent [19]

Wichterle et al.

[11] Patent Number: 4,775,731

[45] Date of Patent: * Oct. 4, 1988

[54] HYDROPHILIC THREE DIMENSIONAL POLYMER AND A METHOD FOR PRODUCTION THEREOF

[75] Inventors: Otto Wichterle; Jiři Trekoval; Jiři Vacik; Jiři Michalek, all of Praha, Czechoslovakia

[73] Assignee: Ceskoslovenska akademie ved, Czechoslovakia

[*] Notice: The portion of the term of this patent subsequent to Aug. 5, 2003 has been disclaimed.

[21] Appl. No.: 844,710

[22] Filed: Mar. 27, 1986

Related U.S. Application Data

[63] Continuation of Ser. No. 718,957, Apr. 2, 1985, Pat. No. 4,604,440.

[30] Foreign Application Priority Data

Apr. 6, 1984 [CS] Czechoslovakia .................. 2633-84

[51] Int. Cl.$^4$ ........................................... C08F 220/40
[52] U.S. Cl. .................................. 526/327; 526/320; 526/303.1; 526/307.7
[58] Field of Search ............... 526/320, 327, 307.7, 526/303.1

[56] References Cited

U.S. PATENT DOCUMENTS 3,966,847  6/1976  Seiderman ........................ 526/320

Primary Examiner—Joseph L. Schofer
Assistant Examiner—Alex H. Walker
Attorney, Agent, or Firm—Leydig, Voit & Mayer

[57] ABSTRACT

Hydrophilic three dimensional polymers, the prevailing mass of which is formed by structural units corresponding to monomers miscible with water at any ratio, and the method for their production, wherein one weight part of the monomers miscible with water is copolymerized, by the effect of free-radical initiators, with 0.01 to 1 weight part of a polyfunctional unsaturated oligomer, which is prepared with an average degree of polymerization $x = 3$ to $x = 100$ by the anionic polymerization of allyl methacrylate, with the contingent addition of methacrylonitrile or methacrylic esters of univalent saturated alcohols containing 1 to 4 carbon atoms or methacrylic esters of monohydroxy compounds containing at least one etheric oxygen atom in the chain, or where 0.7 to 1 weight part of monomers miscible with water is copolymerized with 0.01 to 0.3 weight parts of hydrophobic monomers of the alkyl methacrylate or acrylate type in the presence of an oligomeric crosslinking agent with at least two olefinic double bonds added in the amount of 0.01 to 0.1 weight parts, advantageously up to 0.05 weight parts, by the effect of free-radical initiators.

13 Claims, No Drawings

HYDROPHILIC THREE DIMENSIONAL POLYMER AND A METHOD FOR PRODUCTION THEREOF

This is a continuation of application Ser. No. 718,957, filed Apr. 2, 1985, U.S. Pat. No. 4,604,440.

The invention pertains to hydrophilic three dimensional polymers with the prevailing mass formed by structural units corresponding to monomers miscible with water at any ratio and also to a method for their production.

Among elastomers strongly swelling in water, the cross-linked gels, which have a light three dimensional network formed by chemical bonds reinforced by strong interactions of a physical nature between the chains of the network, assume an important place for their various mechanical properties. Two unique cases where the chains are able to form crystalline ordered beams are these: (1) block copolymers of acrylamide with acrylonitrile (Czechoslovak Pat. No. 148,810); (2) natural collagen and some of its modifications with typical protein quasi-crystalline beams. These gels have striking mechanical properties even at a high swelling with water, viz. a high modulus of elasticity, high tensile strength and elongation. However, their application as biomaterials is considerably limited by a low resistance to hydrolysis of the former and an enzymatic degradation and a yellow-brown discoloration of the latter in contact with living tissues. Only some three dimensional synthetic hydrophilic polymeric gels approach the mechanical properties of the above mentioned outstanding types. These polymers consist of building units from monomers, which differ markedly from one another in their affinity to water. Such polymers are, for example, highly crosslinked copolymers of strongly hydrophilic N-vinylpyrrolidone with a hydrophobic alkyl methacrylate (see, e.g., U.K. Pat. No. 1,514,810; Hosaha et al: J. Biomed. Mater. Res. 14, 557 (1980)).

Improved mechanical properties of the aforesaid hydrophilic gels can be ascribed in particular to the feature that the structurally different monomers form nonhomogeneous chains during polymerization, which contain shorter or longer sequences of hydrophobic units seeking one another, thus causing the so called hydrophobic physical interactions that contribute to the reinforcement of the network. On the other hand, this nonhomogeneity can result in less reactive monomer in the final stage of polymerization which can lead to the formation of a homopolymer that is not anchored in the gel by chemical bonds and which creates an undesirable extractable part. Another disadvantage of the above copolymers consists in high volatility of their hydrophobic monomers, especially of methyl methacrylate, and therefore useful products cannot be obtained with these monomers by monomer casting in open molds. For example, foils cannot be produced by casting on horizontal surfaces or contact lenses cannot be obtained by the method of centrifugal casting.

The invention pertains to a hydrophilic three dimensional polymer, in which the prevailing mass is formed by structural units corresponding to monomers miscible with water at any ratio and which can be prepared by copolymerization of one weight part of the monomers miscible with water, by the effect of free-radical initiators, with 0.01 to 1 part of a polyfunctional unsaturated oligomer with the average degree of polymerization $x=3$ to $x=100$, prepared by the anionic polymerization of allyl methacrylate, to which methacrylonitrile or methacrylic esters of univalent saturated alcohols containing 1 to 4 carbon atoms or of monohydroxy compounds containing at least one etheric oxygen atom in the chain may be added, or by copolymerization of 0.7 to 1 weight part of the monomers mixible with water with 0.01 to 0.3 weight parts of hydrophobic monomers of the alkyl methacrylate or acrylate type in the presence of an oligomeric crosslinking agent with at least two olefinic double bonds added in the amount of 0.01 to 0.1 weight parts, advantageously up to 0.05 weight parts, by the effect of free-radical initiators.

Methacrylates of methanol, ethanol, propanol, isopropyl alcohol, butanol or tert-butyl alcohol are advantageously used as methacrylic esters of univalent saturated alcohols.

Oligomerization of the methacrylic esters can be carried out, for example, by the process according to the Czechoslovak Pat. No. 118,530, where alkaline tertiary alkoxides are used as catalysts and free tertiary alcohols as a chain-transfer agent, i.e. as regulators of the average degree of polymerization. According to the Czechoslovak Pat. No. 112,248, complexes of tertiary alcohols with alkyllithium compounds can also be successfully used for the anionic polymerization.

Hydrophilicity, i.e. the equilibrium swelling of the resulting gel with water, can be adjusted within broad limits according to the weight ratio of the unsaturated oligomer to the hydrophilic monomers. For performing this gel-formation procedure, the common conditions of radical polymerization are adapted in the following way: Thermally unstable catalysts which produce free radicals are used for the thermal polymerization, e.g. dibenzoyl peroxide, diisopropyl peroxocarbonate, or azobisisobutyronitrile, and photoinitiators are used for photopolymerization, e.g. O-alkylbenzoins.

A limit case of hydrophilic unsaturated oligomers are the oligomers solely of allyl methacrylate. They are particularly applicable if hydrophilic water-soluble monomers prevail in the monomer mixture, because larger amounts of the oligomer from only allyl methacrylate would cause the crosslinking to be too strong. However, if it is intended to prepare, for example, very hard hydrophilic gels as sorbents, pure allyl methacrylate oligomers may be used in large amounts.

Hydrophilic monomers, i.e. the unsaturated polymerizable compounds miscible with water at any ratio, may be employed for the copolymerization with the unsaturated polyfunctional oligomer. Among the suitable hydrophilic monomers are included, in particular, N-vinyllactams (N-vinylpyrrolidone, N-vinylpiperidone, N-vinylcaprolactam), methacrylic esters of polyhydroxy compounds (e.g. of ethylene glycol, propylene glycol, 1,3-dihydroxypropane, glycerol, hexanetriol, diethylene glycol, triethylene glycol, pentaerythritol), amides of acrylic and methacrylic acid substituted on nitrogen atom (e.g. N-1,1-dimethyl-3-oxobutyl-acrylamide, N-isobutylacrylamide, N,N-dimethylacrylamide, methacryloylmorpholine). Also, acrylic or methacrylic acid, either free or in the form of alkaline or ammonium salts, can be added to these monomers as an admixture.

Hydrophobic monomers of the alkyl methacrylate or acrylate type may be used in the copolymerization with the monomers miscible with water at any ratio, above all methyl methacrylate, N-butyl methacrylate, tert-butyl methacrylate, dodecyl methacrylate, ethoxyethyl methacrylate, and n-butyl acrylate.

In the above copolymerization of the hydrophilic monomers with the hydrophobic ones, the dimer or trimer of allyl methacrylate or a polyfunctional unsaturated oligomer prepared with an average degree of polymerization $x=3$ to $x=100$ by the anionic polymerization of allyl methacrylate with the contingent addition of methacrylonitrile of methacrylic esters of univalent saturated alcohols containing 1 to 4 carbon atoms or methacrylic esters of monohydroxy compounds, which contain at least one etheric oxygen atom in the chain, can be used as a crosslinking agent. This polyfunctional unsaturated oligomer, prepared with the average polymerization degree $x=3$ to $x=100$, contains on the average 2 to 5 structural units of allyl methacrylate per molecule.

The described gels are noted for a higher or lower modulus of elasticity in the swollen state, according to the mole concentration of alkyl groups in the monomer mixture. These gels are mostly opaque to intensely white, after swelling with water to equilibrium, due to the separation of phases. As it is shown in the following examples, some gels appear among these products which remain perfectly optically clear after swelling and are suitable, for example, for the manufacturing of contact or intraocular lenses.

The method for copolymerization of the oligomer with hydrophilic monomers according to the invention can be advantageously carried out in stationary or rotating open molds for manufacturing of shaped articles, which may be, if it is desired, mechanically worked before swelling. This method has special importance for the production of contact lenses made from materials prepared according to the invention, which are optically clear after swelling.

The copolymerization according to the invention can be carried out advantageously in the presence of solvents. Even higher strength of the final gel, swollen with water to equilibrium, is achieved if the mixture of monomers with the unsaturated oligomer is diluted, than if the copolymerization is carried out without solvents, because an inner stress is reduced in this way, which arises from large volume changes during swelling. The addition of solvents also affects the macroscopic structure of the gels, which fact can be advantageously utilized in the preparation of sorbents.

Preferable organic solvents to be used are dimethylsulfoxide, formaldehyde, dimethylformamide, glycols and their derivatives, glycerol, diacetine, water, dimethylacetamide, isopropyl alcohol, dodecanol, dichloromethane, n-pentanol, and their mixtures.

The method according to the invention enables the production, from virtually nonvolatile components, of hydrophilic gels which have continuous blocks of hydrophobic chains incorporated into their three dimensional network. The reduced volatility of components avoids the critical technical problem of the polymerization in open molds (e.g. in rotation casting of contact lenses), where the higher-swelling materials based on a cross-linked copolymer of N-vinylpyrrolidone, e.g. with methyl methacrylate (Sauflon), which have been used until now, give under these conditions results with only poor reproducibility due primarily to the relatively high vapor pressure of methyl methacrylate. Another disadvantage of the last mentioned material, e.g. Sauflon, is the high content of the water-extractable low-molecular-weight portion in the final articles (15–17%). Materials with a minimum amount of extractable portion are prepared according to the invention.

The invention is further illustrated in the following examples.

EXAMPLE 1

Sodium (0.15 parts) was dissolved in one part of tert.butanol and 5.1 parts allyl methacrylate was added. The mixture was polymerized by heating to 70° C. for 2 hours. Then, 100 ml of 0.5% aqueous acetic acid was added and steam was introduced until one liter of the condensate was collected. A heavy oil material was separated from the water and dried. The oligomer prepared in this way had the average degree of polymerization equal to 3, as determined by chromatographic analysis. The oligomer (2 parts) was diluted in a mixture of 10 parts methyl methacrylate and 90 parts vinylpyrrolidone. The polymerization mixture was homogenized, 0.2 wt.-% (related to the whole mixture) diisopropyl peroxocarbonate was added, air oxygen was removed, and the polymerization was carried out at 60° C. in a glass mold for 14 hours. Various articles can be easily made from the product by turning and polishing, e.g. replicas of contact lenses. The product swells in the contact with water up to the equilibrium water content of 84 weight percent. The shear modulus of the hydrated optically homogeneous gel was 0.044 MPa.

EXAMPLE 2

Allyl methacrylate (0.02 mol) and methyl methacrylate (0.30 mol) were added to 0.016 mol sodium tert.butoxide and 0.0064 mol tert.butanol. The mixture was polymerized by heating to 40° C. for 140 min. Then, 0.018 mol acetic acid was added, homogenized, and the whole mixture was dissolved in chloroform and precipitated in a 20 fold amount of methanol. The resulting 50-mer was washed with methanol on a fitted-glass filter and dried in a vacuum at 40° C.

Ten parts of the 50-mer was dissolved in 90 parts vinyl-pyrrolidone in the presence of 0.2 wt.-% methyl azo-bis-isobutyrate and homogenized. Air oxygen was removed, and the polymerization was carried out at 60° C. in a polypropylene mold. The resulting optically homogeneous block was overcast with water. It contained in the equilibrium 80 wt.-% water and had a shear modulus $G=0.146$ MPa.

EXAMPLE 3

The 50-mer (30 parts) prepared according to Example 2, 70 parts vinylpyrrolidone and 0.3 wt. % azobisisobutyronitrile were freed of air oxygen and polymerized at 60° C. in a glass mold. The resulting optically homogeneous block was overcast with water. It contained in the equilibrium 59 wt.-% water and had a shear modulus $G=2,090$ MPa.

EXAMPLE 4

A trimer (20 parts) prepared according to Example 1 was mixed with 80 parts diglycol monomethacrylate and 0.3 wt.-% (on the whole mixture) diisopropyl peroxocarbonate and polymerized at 60° C. in a polypropylene mold. The resulting opaque gel contained in the equilibrium 74 wt.-% water at $G=0.038$ MPa.

EXAMPLE 5

The mixture containing 15 parts of the 50-mer, prepared according to Example 2, and 85 parts N-vinylpyrrolidone (80 wt.-%) was mixed with 20 wt.-% diacetine and 0.4 wt.-% azobisisobutyronitrile (on the whole polymerization mixture) and polymerized in a glass mold at 60° C. The resulting optically homogeneous gel contained in equilibrium 79.21 wt.-% H$_2$O. The shear modulus was G32 0.111 MPa. Extractable portions amounted less than 1 wt. %. This procedure is suitable for the preparation of contact lenses.

EXAMPLE 6

The mixture containing 15 parts of the 50-mer, prepared according to Example 2, and 85 parts N-vinylpyrrolidone (80 wt. %) was mixed with 20 wt.-% dimethylsulfoxide and 0.4 wt.-% diisopropyl peroxocarbonate (on the whole polymerization mixture) and polymerized in a polypropylene mold at 60° C. The resulting optically homogeneous gel contained in equilibrium 79.47 wt. % H$_2$O. The shear modulus was G=0.15 MPa. Extractable portions amounted to less than 1 wt.-%. This procedure is suitable for the preparation of contact lenses, for example, by centrifugal casting.

EXAMPLE 7

The mixture containing 15 parts of the 50-mer, prepared according to Example 2, and 85 parts N-vinylpyrrolidone (70 wt.%) was mixed with 30% diacetine. Azobisisobutyronitrile (0.4 wt.%) was added on the whole mixture, the polymerization mixture was freed of oxygen and polymerized at 60° C. in a glass mold. The resulting polymer was optically homogeneous, contained in equilibrium 80.85% water and had a shear modulus G=0.132 MPa. The polymer is suitable for contact lenses.

EXAMPLE 8

The mixture containing 15 parts of the 50-mer, prepared according to Example 2, and 85 parts N-vinylpyrrolidone (80 wt.-%) was mixed with 20 wt.-% n-pentanol. Azobisisobutyronitrile was added in the amount 0.4 wt.-% on the whole polymerization mixture, which was then freed of oxygen and polymerized at 60° C. in a glass mold. The resulting polymer was optically homogeneous, contained in equilibrium 77.80 wt.-% water, and had a shear modulus G=0.112 MPa. The polymer is suitable for the preparation of contact lenses.

EXAMPLE 9

The mixture containing 15 parts of the 50-mer, prepared according to Example 2, and 85 parts N-vinylpyrrolidone (80 wt.%) was mixed with 20 wt.% isopropyl alcohol and 0.4 wt.% azobisisobutyronitrile was added (on the whole mixture). The polymerization mixture was freed of oxygen and polymerized at 60° C. in a glass mold. The resulting polymer was optically homogeneous, contained in equilibrium 80.51 wt.-%, and had a shear modulus G=0.121 MPa. The polymer is suitable for the preparation of contact lenses.

EXAMPLE 10

The mixture containing 15 parts of the 50-mer, prepared according to Example 2, and 85 parts N-vinylpyrrolidone (60 wt. %) was mixed with 40 wt.-% isopropyl alcohol and 0.5 wt. % diisopropyl peroxocarbonate was added on the whole mixture. The polymerization mixture was freed of oxygen and polymerized at 60° C. in a polypropylene mold. The resulting polymer was optically homogeneous, contained 82.6 wt.-% water in equilibrium, and had a shear modulus G=0.082 MPa. The polymer obtained is suitable for the preparation of contact lenses.

EXAMPLE 11

The mixture containing 80 wt.-% N-vinylpyrrolidone and 20 wt.-% of the 50-mer, prepared according to Example 2, was homogenized and 0.5 wt.-% diisopropyl peroxocarbonate was added on the whole mixture. The polymerization mixture was freed of oxygen and polymerized at 60° C. in a glass mold. The resulting xerogel can be easily mechanically worked, was optically homogeneous after swelling in water, contained 70 wt.-% water in equilibrium, and had a shear modulus G=0.52 MPa. The polymer is suitable for the preparation of contact lenses or subcutaneous implants.

EXAMPLE 12

The mixture containing 95 wt.-% N-vinylpyrrolidone and 5 wt.-% N-tert.butylacrylamide was mixed with 2% dimer of allyl methacrylate, which was prepared analogously as the trimer in Example 1, and 0.4 wt.-% diisopropyl peroxocarbonate (on the whole mixture). The, mixture was freed of oxygen by bubbling-through with nitrogen and polymerized at 60° C. in a polypropylene mold. The resulting xerogel was optically homogeneous after swelling in water and contained in equilibrium 83 wt.-% H$_2$O; G=0.171 MPa.

EXAMPLE 13

The mixture containing 80 wt.-% N-vinylpyrrolidone and 20 wt.-% lauryl methakrylate was mixed with 1 part of the allyl methacrylate dimer, prepared analogously as the trimer according to Example 1, and 0.4 wt. % azobisisobutyronitrile (based on the whole mixture). The polymerization mixture was freed of oxygen and polymerized at 60° C. The resulting white polymer contained, after equilibrium swelling, 81 wt.-% water and had a shear modulus G=0.066 MPa. The polymer is suitable for medical purposes.

EXAMPLE 14

The mixture containing 90 wt.-% N-vinylpyrrolidone and 10 wt.-% ethylhexyl methacrylate was mixed with 1 part of the allyl methacrylate dimer, prepared analogously as the trimer according to Example 1, and with 0.4 wt.-% azobisisobutyronitrile. The polymerization mixture was homogenized, freed of oxygen, and polymerized at 60° C. in a glass mold. The resulting xerogel was opaque after swelling, contained in equilibrium 87 wt.-% H$_2$O, and had a shear modulus G=0.051 MPa. The polymer is suitable for medical purposes.

EXAMPLE 15

The mixture containing 80 wt:-% N-vinylpyrrolidone and 20 wt.-% methyl methacrylate was mixed with the trimer of n-butyl methacrylate and allyl methacrylate, which was prepared similarly as the trimer according to Example 1, and 0.4 wt.-% diisopropyl peroxocarbonate was added. The polymerization mixture was homogenized, freed of oxygen, and polymerized at 60° C. The resulting xerogel was white and microheterogeneous, after swelling to equilibrium, and contained 86 wt.-% H$_2$O. The shear modulus was 0.015 MPa.

EXAMPLE 16

The mixture containing 90 wt.-% N-vinylpyrrolidone and 10 wt.-% of a decamer of methacrylonitrile and allyl methacrylate (in the ratio 4:1), which was prepared similarly as the trimer according to Example 1 or the 50-mer according to Example 2, was mixed with 0.4 wt.-% azobisisobutyronitrile, freed of oxygen, and polymerized at 60° C. in a polypropylene mold. The resulting yellowish xerogel was milklike opalescent after swelling to equilibrium, contained 81 wt.-% $H_2O$ and had a shear modulus G=0.041 MPa. The resulting polymer is suitable for medical purposes.

EXAMPLE 17

Allyl methacrylate (0.02 mole) and 0.3 mole ethyl methacrylate were mixed with 0.016 mole sodium tert-butoxide and 0.0064 mole tert-butanol. The mixture was polymerized by heating to 40° C. for 140 min. Then, 0.018 mole acetic acid was added, stirred, and the whole mixture was dissolved in chloroform and precipitated in 20 volumes of methanol. The resulting 50-mer was washed on a sintered-glass filter and dried in vacuum at 40° C. Ten parts of the 50-mer were dissolved in 90 parts N-vinylpyrrolidone in the presence of 0.3 wt.-% azobisisobutyronitrile, freed of air oxygen, and polymerized in a polypropylene mold at 60° C. for 16 hours. The prepared block was swelled in water and contained 77 wt.-% water at $G=1.68$ kg.cm$^{-2}$, i.e. 0.168 MPa.

EXAMPLE 18

The 50-mer (10 part), prepared according to Example 17 from 0.016 mole tert-BuONa, 0.0064 mole tert-butanol, 0.02 mole allyl methacrylate, and 0.30 mole propyl methacrylate, was dissolved in 90 parts N-vinylpyrrolidone in the presence of 0.3 wt.-% azobisisobutyronitrile. The mixture was freed of air oxygen and polymerized in a polypropylene mold at 60° C. for 16 h. The resulting block was swelled in water and contained 76 wt.-% water at G=0.172 MPa.

EXAMPLE 19

The 50-mer (10 parts), prepared according to Example 17 from 0.016 mole tert-BuONa, 0.0064 mole tert-butanol, 0.02 mole alyl methacrylate and 0.30 mole isopropylmethacrylate, was dissolved in 90 parts N-vinylpyrrolidone in the presence of 0.3 wt.-% azobisisobutyronitrile. The mixture was freed of air oxygen and polymerized in a polypropylene mold at 60° C. for 16 h. The resulting block was swelled in water and contained 76 wt.-% water at G=0.175 MPa.

EXAMPLE 20

The 50-mer (10 parts), prepared according to Example 17 from 0.016 mole tert-BuONa, 0.0064 mole tert-butanol, 0.02 mole allyl methacrylate and 0.30 mole butyl methacrylate, was dissolved in 90 parts N-vinylpyrrolidone in the presence of 0.3 wt.-% azobisisobutyronitrile. The mixture was freed of air oxygen and polymerized in a polypropylene mold at 60° C. for 16 h. The resulting block was swelled in water and contained 72 wt.-% water at G=0.195 MPa.

EXAMPLE 21

The 50-mer (10 parts), prepared according to Example 17 from 0.016 mole tert-BuONa, 0.0064 mole tert-butanol, 0.02 mole allyl methacrylate and 0.30 mole tert-butyl methacrylate, was dissolved in 90 parts N-vinylpyrrolidone in the presence of 0.3 wt.-% azobisisobutyronitrile. The mixture was freed of air oxygen and polymerized in a polypropylene mold at 60° C. for 16 h. The resulting block was swelled in water and contained 70 wt.-% water at G=0.208 MPa.

EXAMPLE 22

The 50-mer (10 parts), prepared according to Example 17 from 0.016 mole tert-BuONa, 0.0064 mole tert-butanol, 0.02 mole allyl methacrylate and 0.30 mole ethoxyethyl methacrylate, was dissolved in 90 parts N-vinylpyrrolidone in the presence of 0.3 wt.-% azobisisobutyronitrile. The mixture was freed of air oxygen and polymerized in a polypropylene mold at 60° C for 16 h. The resulting block was swelled in water and contained 78 wt.-% water at G =0.155 MPa.

EXAMPLE 23

Azobisisobutyronitrile (0.4 wt.-%) was added to a mixture of 80 wt.-% N-vinylpyrrolidone and 20 wt.-% dekamer of methacryonitrile and allyl methacrylate (molar ratio 4:1; prepared according to Example 16), air oxygen was removed and the polymerization was carried out in a polypropylene mold at 60° C. for 16 hours. The resulting yellowish xerogel was swelled in water to equilibrium and exhibited then a milklike opalescence and contained 68 wt-% water at G=0.045 MPa.

EXAMPLE 24

Azobisisobutyronitrile (0.4 wt-%) was added to a mixture containing 70 wt.-% N-vinylpyrrolidone and 30 wt.-% dekamer of methacrylonitrile and allyl methacrylate (molar ratio 4:1; prepared according to Example 16), air oxygen was removed and the polymerization was carried out in a polypropylene mold at 60° C. for 16 h. The resulting yellowish xerogel was swelled in water to equilibrium and exhibited a milklike opalescence and contained 49 wt.-% water at G=0.059 MPa.

EXAMPLE 25

Azobisisobutyronitrile (0.4 wt.-%) was added to a mixture containing 95 wt.-% N-vinylpyrrolidone and 5 wt.-% dekamer of methacrylonitrile and allyl methacrylate (molar ratio 4:1; prepared according to Example 16), air oxygen was removed and the polymerization was carried out in a polypropylene mold at 60° C. for 16 hours. The resulting xerogel was, after swelling with water to equilibrium, almost clear and contained 86 wt.-% water at G=0.04 MPa. The polymer is suitable for medical purposes.

EXAMPLE 26

Azobisisobutyronitrile (0.4 wt.-%) was added to a mixture containing 70 wt.-% N-vinylpyrrolidone and 30 wt.-% dekamer of methyl methacrylate and allyl methacrylate (molar ratio 4:1; prepared similarly as the dekamer in Example 16). Air oxygen was removed and the polymerization was carried out in a polypropylene mold at 60° C. for 16 h. The resulting yellowish xerogel was, after swelling with water to equilibrium, slightly opalescent and contained 61 wt.-% water at G=0.340 MPa. The soluble portion was 3%.

EXAMPLE 27

The mixture containing 80 wt.-% N-vinylpyrrolidone and 20 wt.-% dekamer according to Example 26 was polymerized in a polypropylene mold at 60° C. for 16 h in the presence of 0.4 wt.-% azobisisobutyronitrile. The resulting gel contained, after swelling with water, 71 wt.-% water at G=0.224 MPa.

EXAMPLE 28

The mixture containing 90 wt.-% N-vinylpyrrolidone and 10 wt.-% hektamer (100-mer) of methyl methacrylate and allyl methacrylate (molar ratio 15:1) prepared analogously as the 50-mer in Example 2) was polymerized in a polypropylene mold at 60° C. for 16 h in the presence of 0.4 wt.-% azobisisobutyronitrile. The resulting clear gel contained, after swelling with water, 65 wt.-% water at G=0.75 MPa.

EXAMPLE 29

The mixture containing 80 wt.-% N-vinylpyrrolidone and 20 wt.-% hektamer according to Example 28 was polymerized in a polypropylene mold at 60° C. for 16 h in the presence of 04 wt.-% azobisisobutyronitrile. The resulting gel was, after swelling with water, opalescent and contained 55 wt.-% water at G=1.83 MPa.

EXAMPLE 30

The dimer of allyl methacrylate, which was prepared according to Example 1, was added in the amount of 3 wt.-% (related to the entire mixture) to the mixture containing 80 wt.-% N-vinylpyrrolidone and 20 wt. % dodecyl methacrylate. The mixture was homogenized, freed of air oxygen and polymerized in the presence of 0.4 wt.-% azobisisobutyronitrile in a polypropylene mold at 60° C. for 16 h. The resulting gel contained, after swelling with water, 72 wt.-% water at G=0.027 MPa. The soluble portion was 2%.

EXAMPLE 31

The dimer of allyl methacrylate, which was prepared according to Example 1, was added in the amount of 1 wt.-% (related to the entire mixture) to the mixture containing 70 wt.-% N-vinylpyrrolidone and 30 wt.-% dodecyl methacrylate. The mixture was homogenized, freed of air oxygen and polymerized in the presence of 0.4 wt.-% azobisisobutyronitrile in a polypropylene mold at 60° C. for 16 h. The resulting gel contained, after swelling with water, 77 wt.-% water at G=0.067 MPa.

EXAMPLE 32

The dimer of allyl methacrylate, which was prepared according to Example 1, was added in the amount of 3 wt.-% (based on to the entire mixture) to the mixture containing 90 wt.-% N-vinylpyrrolidone and 10 wt.-% dodecyl methacrylate. The mixture was polymerized in a polypropylene mold at 60° C. for 16 h in the presence of 0.4 wt.-% azobisisobutyronitrile. The resulting gel contained, after swelling with water, 76 wt.-% water at G=0.048 MPa. The soluble extractable portion was 2%.

EXAMPLE 33

The mixture containing 90 wt.-% N-vinylpyrrolidone, 10 wt.-% N-tert-butylacrylamide and 1 wt.-% dimer of allyl methacrylate (based on the entire mixture), which was prepared according to Example 1, was polymerized in a polypropylene mold at 60° C. for 16 h in the presence of 0.4 wt.-% azobisisobutyronitrile. The resulting gel was, after swelling, opalescent and contained 87 wt.-% water at G=0.056 MPa.

EXAMPLE 34

The dimer of allyl methacrylate, prepared according to Example 2, was added in the amount of 3 wt.-% (based on the entire mixture) to the mixture of 97 wt.-% N-vinylpyrrolidone and 3 wt.-% N-tertbutylacrylamide. The mixture was polymerized in a polypropylene mold at 60° C. for 16 h in the presence of 0.4 wt.-% azobisisobutyronitrile. The resulting clear gel contained, after swelling with water, 73 wt.-% water at G=0.480 MPa. The soluble extractable portion was less than 1%.

EXAMPLE 35

The dimer of allyl methacrylate, prepared according to Example 1, was added in the amount of 1 wt.-% (based on the entire mixture) to the mixture containing 90 wt.-% N-vinylpyrrolidone and 10 wt.-% ethoxyethyl methacrylate. The mixture was polymerized in a polypropylene mold at 60° C. for 16 h in the presence of 0.4 wt.-% azobisisobutyronitrile. The resulting opalescent gel contained, after swelling with water, 87 wt.-% water at G=0.051 MPa.

EXAMPLE 36

The dimer of allyl methacrylate, prepared according to Example 1, was added in the amount of 1 wt.-% (based on the entire mixture) to the mixture containing 80 wt.-% N-vinylpyrrolidone and 20 wt.-% ethoxyethyl methacrylate. The mixture was polymerized in a polypropylene mold at 60° C. for 16 h in the presence of 0.4 wt.-% azobisisobutyronitrile. The resulting opalescent gel contained, after swelling with water, 84 wt.-% water at G=0.063 MPa.

EXAMPLE 37

The dimer of allyl methacrylate, prepared according to Example 1, was added in the amount of 1 wt.-% (based on the entire mixture) to the mixture containing 70 wt.-% N-vinylpyrrolidone and 30 wt.-% ethoxyethyl methacrylate. The mixture was polymerized in a polypropylene mold at 60° C. for 16 h in the presence of 0.4 wt.-% azobisisobutyronitrile. The resulting gel contained, after swelling with water, 82 wt.-% water at G=0.099 MPa. The content of soluble extractables was 3.5%.

EXAMPLE 38

A trimer of butyl methacrylate and allyl methacrylate, which was prepared analogously to the dimer in Example 1, was added to the mixture containing 90 wt.-% N-vinylpyrrolidone and 10 wt.-% butyl methacrylate in the amount of 1 wt.-% on the whole mixture. The mixture was polymerized in a polypropylene mold at 60° C. for 16 h in the presence of 0.4 wt.-% azobisisobutyronitrile. The resulting gel contained, after swelling with water, 72 wt.-% water at G=0.023 MPa.

EXAMPLE 39

The dimer of allyl methacrylate, which was prepared according to Example 1, was added to the mixture containing 97 wt.-% N-vinylpyrrolidone and 3 wt.-% tert-butyl methacrylate in the amount of 1 wt-% on the whole mixture. The mixture was polymerized in a polypropylene mold at 60° C. for 16 h in the presence of 0.4 wt.-% azobisisobutyronitrile. The resulting gel contained, after swelling with water, 90 wt.-% water at G=0.038 MPa.

EXAMPLE 40

The dimer of allyl methacrylate, which was prepared according to Example 1, was added to the mixture containing 80 wt.-% N-vinylpyrrolidone and 20 wt.-% tert-butyl methacrylate in the amount of 1 wt.-% on the whole mixture. The mixture was polymerized in a polypropylene mold at 60° C. for 16 h in the presence of 0.4 wt.-% azobisisobutyronitrile. The resulting gel contained, after swelling with water, 67 wt.-% water at G=0.529 MPa.

EXAMPLE 41

The dimer of allyl methacrylate, which was prepared according to Example 1, was added to the mixture containing 70 wt.-% N-vinylpyrrolidone and 30 wt.-% tert-butyl methacrylate in the amount of 1 wt.-% on the whole mixture. The mixture was polymerized in a polypropylene mold at 60° C. for 16 h in the presence of 0.4 wt.-% azobisisobutyronitrile. The resulting gel was opalescent and contained, after swelling with water, 47 wt.-% water at G=1.238 MPa. The content of soluble extract was 3%.

EXAMPLE 42

A mixture (80 wt.-%) containing 85 wt.-% N-vinylpyrrolidone and 15 wt.-% of the 50-mer, which was prepared according to Example 2, was mixed with 20 wt.-% of a solvent composition containing 80 wt.-% diacetine and 20 wt.-% water. The resulting mixture was polymerized in a polypropylene mold at 60° C. for 16 h in the presence of 0.4 wt.-% azobisisobutyronitrile (on the whole mixture). The resultant opalescent gel contained 82 wt.-% water after swelling.

EXAMPLE 43

A mixture (80 wt.-%) containing 85 wt.-% N-vinypyrrolidone and 15 wt.-% of the 50-mer, which was prepared according to Example 2, was mixed with 20 wt.-% of a solvent composition containing 60 wt.1-% dimethylformamide and 40 wt.-% glycerol The resulting mixture was polymerized in a polypropylene mold at 60° C. for 16 h in the presence of 0.4 wt.-% azobisisobutyronitrile (on the whole mixture). The resultant opalescent gel contained, after swelling with water, 81 wt.-% water.

EXAMPLE 44

A mixture (80 wt.-%) containing 85 wt.-% N-vinylpyrrolidone and 15 wt.-% of the 50-mer, which was prepared according to Example 2, was mixed with 20 wt.-% of a solvent composition containing 60 wt.-% dimethylsulfoxide and 40 wt.-% glycerol. The resulting mixture was polymerized in a polypropylene mold at 60° C. for 16 h in the presence of 0.4 wt-% azobisisobutyronitrile (on the whole mixture). The resultant opalescent gel contained, after swelling with water, 80 wt.-% water.

EXAMPLE 45

A mixture (80 wt.-%) containing 85 wt.-% N-vinylpyrrolidone and 15 wt.-% of the 50-mer, which was prepared according to Example 2, was mixed with 20 wt.-% formamide and polymerized in a polypropylene mold at 60° C. for 16 h in the presence of 0.4 wt.-% azobisisobutyronitrile (on the whole mixture). The resulting opalescent gel contained 90 wt.-% water after swelling.

EXAMPLE 46

A mixture (80 wt.-%) containing 85 wt.-% N-vinylpyrrolidone and 15 wt.-% of the 50-mer, which was prepared according to Example 2, was mixed with 20 wt.-% dimethylformamide and polymerized in a polypropylene mold at 60° C. for 16 h in the presence of 0.4 wt.-% azobisisobutyronitrile (on the whole mixture). The resulting opalescent gel contained 77 wt.-% water after swelling.

EXAMPLE 47

A mixture (80 wt.-%) containing 90 wt.-% N-vinylpyrrolidone and 10 wt.-% of the 50-mer, which was prepared according to Example 2, was mixed with 20 wt.-% dichloromethane and polymerized in a polypropylene mold at 60° C. for 16 h in the presence of 0.4 wt.-% azobisisobutyronitrile (on the whole mixture). The resulting gel was, after swelling with water, homogeneous and transparent and contained 82 wt.-% water at G=0.31 MPa. The content of soluble extractables was 1.3%.

EXAMPLE 48

A mixture (80 wt.-%) containing 90 wt.-% N-vinylpyrrolidone and 10 wt. % of the 50-mer, which was prepared according to Example 2, was mixed with 20 wt.-% diethylene glycol and polymerized in a polypropylene mold at 60° C. for 16 h in the presence of 0.4 wt.-% azobisisobutyronitrile (on the whole mixture). The resulting gel contained, after swelling with water, 88 wt.-% water at G=0.19 MPa.

EXAMPLE 49

A mixture (80 wt.-%) containing 90 wt.-% N-vinylpyrrolidone and 10 wt.-% of the 50-mer, which was prepared according to Example 2, was mixed with 20 wt.-% triethylene glycol and polymerized in a polypropylene mold at 60° C. for 16 h in the presence of 0.4 wt.-% azobisisobutyronitrile (on the whole mixture). The resulting gel contained, after swelling with water, 88 wt.-% water at G=0.045 MPa.

EXAMPLE 50

A mixture (80 wt.-%) containing 90 wt.-% N-vinylpyrrolidone and 10 wt.-% of the 50-mer, which was prepared according to Example 2, was mixed with 20 wt.-% diethylene glycol dimethyl ether and polymerized in a polypropylene mold at 60° C. for 16 h in the presence of 0.4 wt.-% azobisisobutyronitrile (on the whole mixture). The resulting gel contained, after swelling with water, 82 wt.-% water at G=0.125 MPa. The content of the soluble portion was 0.3%.

EXAMPLE 51

A mixture (80 wt.-%) containing 90 wt.-% N-vinylpyrrolidone and 10 wt.-% of the 50-mer, which was prepared according to Example 2, was mixed with 20 wt.-% triethylene glycol dimethyl ether and polymerized in a polypropylene mold at 60° C. for 16 h in the presence of 0.4 wt.-% azobisisobutyronitrile (on the whole mixture). The resulting gel contained, after swelling with water, 82 wt.-% water at G=0.368 MPa. The content of extractables was 2.4%.

EXAMPLE 52

A mixture (80 wt.-%) containing 90 wt.-% N-vinylpyrrolidone and 10 wt.-% of the 50-mer, which was prepared according to Example 2, was mixed with 20 wt.-% dodecanol and polymerized in a polypropylene mold at 60° C. for 16 h in the presence of 0.4 wt.-% azobisisobutyronitrile (on the whole mixture). The resulting gel contained, after swelling with water, 81 wt.-% water at G=0.364 MPa.

EXAMPLE 53

A mixture (80 wt.-%) containing 90 wt.-% N-vinylpyrrolidone and 10 wt.-% of the 50-mer, which was prepared according to Example 2, was mixed with 20 wt.-% poly(ethylene glycol) with an average molecular weight 400 and polymerized in a polypropylene mold at 60° C. for 16 in the presence of 0.4 wt.-% azobisisobutyronitrile (on the whole mixture). The resulting clear gel was, after swelling with water, slightly opalescent and contained 83 wt.-% water at G=0.138 MPa.

EXAMPLE 54

A mixture (80 wt.-%) containing 90 wt.-% N-vinylpyrrolidone and 10 wt.-% of the 50-mer, which was prepared according to Example 2, was mixed with 20 wt.-% dimethylacetamide and polymerized in a polypropylene mold at 60° C. for 16 h in the presence of 0.4 wt.-% azobisisobutyronitrile (on the whole mixture). The resulting gel contained 82 wt.-% water after swelling.

We claim as our invention:

1. A hydrophilic three dimensional polymer having a prevailing mass comprising structural units which correspond to monomers miscible with water at any ratio, said polymer prepared in the presence of a free-radical initiator by the copolymerization of
    (a) one part by weight of a monomer miscible with water, and
    (b) 0.01 to 1 part by weight of a polyfunctional unsaturated oligomer with an average degree of polymerization $x=5$ to $x=100$, said oligomer prepared by the anionic polymerization of
        (i) a member selected from the group consisting of methacrylonitrile, methacrylic esters of univalent saturated alcohols containing 1 to 4 carbon atoms and methacrylic esters of monohydroxy compounds containing at least one etheric oxygen atom in the chain, and
        (ii) allyl methacrylate.

2. The hydrophilic three dimensional polymer according to claim 1, wherein the univalent saturated alcohol is an alcohol selected from the group consisting of methanol, ethanol, propanol, isopropyl alcohol, butanol or tert-butanol.

3. The hydrophilic three dimensional polymer according to claim 1 wherein said monomer miscible with water at any ratio is a member selected from the group consisting of N-vinypyrrolidone, hydroxyethyl methacrylate, diethylene glycol monomethacrylate, triethylene glycol monomethacrylate, N-substituted amides of acrylic acid, methacrylic acid, acrylic acid methacrylic acid and ammonium salts thereof, and mixtures thereof.

4. The hydrophilic three dimensional polymer according to claim 2 wherein said monomer miscible with water at any ratio is a member selected from the group consisting of N-vinypyrrolidone, hydroxyethyl methacrylate, diethylene glycol monomethacrylate, triethylene glycol monomethacrylate, N-substituted amides of acrylic acid, methacrylic acid, acrylic acid methacrylic acid and ammonium salts thereof, and mixtures thereof.

5. The hydrophilic three dimensional polymer according to claim 1 wherein the polyfunctional unsaturated oligomer, which was prepared with the average degree of polymerization $x=5$ to $x=100$, contains on the average 2 to 5 structural units of allyl methacrylate per molecule of polymer.

6. A hydrophilic three dimensional polymer having a prevailing mass comprising structural units which correspond to monomers miscible with water at any ratio, said polymer prepared in the presence of a free-radical initiator by the copolymerization of
    (a) one part by weight of a monomer miscible with water, and
    (b) 0.01 to 1 part by weight of a polyfunctional unsaturated oligomer with an average degree of polymerization $x=5$ to $x=100$, said oligomer prepared by the anionic polymerization of allyl methacrylate.

7. The hydrophilic three dimensional polymer according to claim 6 wherein said monomer miscible with water at any ratio is a member selected from the group consisting of N-vinylpyrrolidone, hydroxyethyl methacrylate, diethylene glycol monomethacrylate, triethylene glycol monomethacrylate, N-substituted amides of acrylic acid, methacrylic acid, acrylic acid methacrylic acid and ammonium salts thereof, and mixtures thereof.

8. The hydrophilic three dimensional polymer according to claim 6 wherein the polyfunctional unsaturated oligomer, which was prepared with the average degree of polymerization $x=5$ to $x=100$, contains on the average 2 to 5 structural units of allyl methacrylate per molecule of polymer.

9. A hydrophilic three dimensional polymer having a prevailing mass comprising structural units which correspond to monomers miscible with water at any ratio, said polymer prepared in the presence of a free-radical initiator by the copolymerization of
    (a) 0.7 to 1 part by weight of a monomer miscible with water, and
    (b) 0.01 to 0.3 part by weight of a hydrophobic monomer selected from the group consisting of alkyl acrylate and alkyl methacrylate, in the presence of 0.01 to 0.1 part by weight of an oligomeric crosslinking agent.

10. The hydrophilic three dimensional polymer of claim 9 wherein said oligomeric crosslinking agent contains at least two olefinic double bonds.

11. The hydrophilic three dimensional polymer according to claim 9 wherein the hydrophobic monomer of the alkyl methacrylate or acrylate type is selected from the group consisting of methyl methacrylate, n-butylmethacrylate, tert-butyl methacrylate, dodecyl methacrylate, ethoxyethyl methacrylate, and n-butyl acrylate.

12. The hydrophilic three dimensional polymer according to claim 9 wherein the oligomeric crosslinking agent is a member selected from the group consisting of a dimer of allyl methacrylate, a trimer of allyl methacrylate, and a polyfunctional unsaturated oligomer of allyl methacrylate with an average degree of polymerization $x=5$ to $x=100$, said dimer, trimer or oligomer prepared by the anionic polymerization of allyl methacrylate with a member selected from the group consisting of methacrylonitrile, methacrylic ester of univalent saturated alcohols containing 1 to 4 carbon atoms, and methacrylic esters of monohydroxy compounds containing at least one etheric oxygen atom in the chain.

13. The hydrophilic three dimensional polymer of claim 9 wherein said oligomeric crosslinking agent is present in from about 0.01 to about 0.05 parts by weight.

* * * * *